Feb. 21, 1928.
F. G. CREED
1,659,724
CLUTCH MECHANISM
Filed Feb. 17. 1926
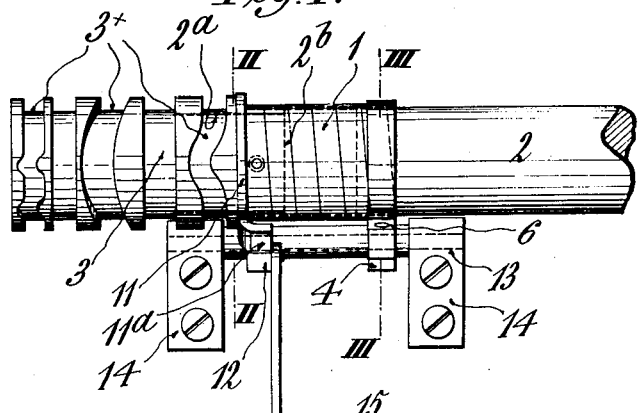
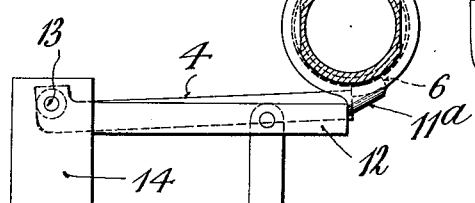
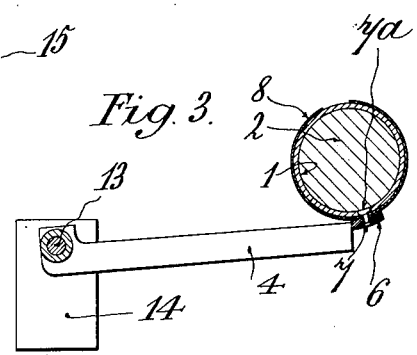
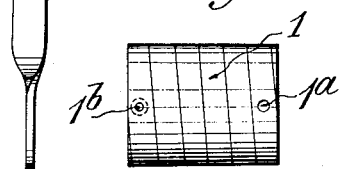
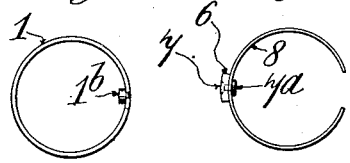
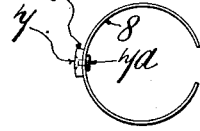
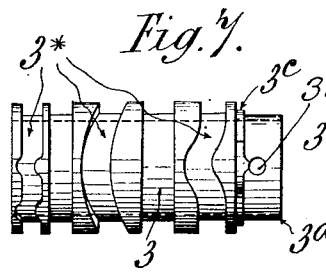
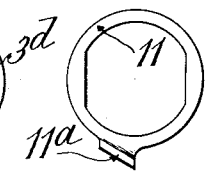
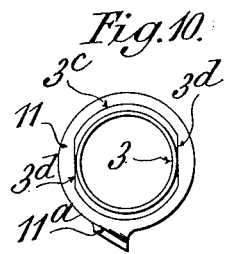
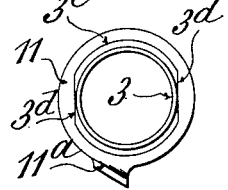
Frederick George Creed
By Davis & Davis
Attys Patented Feb. 21, 1928.

1,659,724

UNITED STATES PATENT OFFICE.

FREDERICK GEORGE CREED, OF CROYDON, ENGLAND.

CLUTCH MECHANISM.

Application filed February 17, 1926, Serial No. 88,860, and in Great Britain February 24, 1925.

This invention has reference to that kind of clutch mechanism which comprises a helically coiled metal spring arranged to surround a driving shaft and adapted, when free, to engage the same by contractile action, a rotary body, as for example a cam or cams, arranged to be driven from one end of the spring, and a spring holding and releasing device (hereinafter called for brevity the detent), the arrangement being such that when the detent is moved into its operative position to engage the spring, it acts to expand the spring slightly and thereby disconnect the same and the rotary body from the driving shaft, and, when moved into its inoperative position, to release the spring, will allow the same immediately to contract upon the shaft so that it and the said body will rotate therewith until again arrested by the detent.

In clutch mechanism of the kind referred to, the spring, composed of a coiled strip of metal, has been rigidly fixed at one end to the rotary body and provided at its other extreme end with an abutment with which the detent engages each time the spring and rotary body are to be disconnected from the driving shaft upon which they are mounted. With this arrangement, when the spring is arrested by the detent, the convolutions of the spring nearest the free end are caused to expand more than the convolutions near the end attached to the rotary body, which is undesirable, and the rotary body is brought to rest by a force acting, owing to the inertia of such body, throughout the length of the spring in a direction tending to expand the spring to a further extent. When the spring is released and allowed to contract on and grip the shaft and drive the said body, it is subjected, owing to the inertia of the body, to a torsional force, acting in the opposite direction to the first force and tending to wind up the spring. As a result, it is found in practice that when the spring and rotary body have to be arrested and released in rapid succession, say at each revolution of a rapidly revolving shaft, the spring, owing to the alternating strains, in opposite directions, to which it is subjected, soon becomes fractured, so that its replacement necessitates temporary stoppage of the apparatus of which the clutch mechanism forms a part.

The present invention has for its object to avoid these disadvantages.

To prevent the spring uncoiling at its free end, more than at its fixed end, when arrested, the abutment instead of being applied to the extreme free end of the spring, as heretofore, is applied to the spring at a distance from its free end, say to the extent of one convolution of the spring. Also, instead of fixing the abutment direct to the spring, which may be of flat spring metal, it may advantageously be fixed to the central portion of a split ring of flat spring metal adapted to embrace the end portion of the spring, the abutment having an inward extension arranged to enter a hole in the spring at a distance from the free end thereof.

Also, instead of rigidly connecting the spring at its other or second extreme end directly to the rotary body, as heretofore, it is connected thereto at a distance from such extreme end, and also indirectly to a second abutment. Associated with the two abutments are two detents so arranged that the one designed to coact with the second abutment to arrest the second end of the spring and rotary body will come into operation shortly after the other detent has come into operation to arrest the other or free end of the spring. In this way the spring is relieved of shock when stopping and starting the rotary body.

In the accompanying illustrative drawings, Fig. 1 shows in plan, one construction of clutch mechanism of the kind referred to embodying the invention. Figs. 2 and 3 are cross sections on the lines II—II and III—III respectively of Fig. 1. Figs. 4 to 10 are detail views of the clutch mechanism.

1 is the coiled spring, formed of flat spring metal, surrounding a driving shaft 2, and adapted, when free, to engage such shaft by contractile action so as to be rotated by such shaft. 3 is a rotary body formed with a number of cam grooves $3^x$ and designed to be driven from the shaft through the spring. 4 is a detent lever adapted to be brought by any desired means and at the required times, into the path of an abutment 6 carried by the free end portion of the spring 1. The abutment 6 is constituted by a square piece of metal fixed by a rivet 7 to the central portion of a split ring 8, (Fig. 6) of flat spring metal adapted to embrace the free end portion of the spring 1 (Fig. 3), the rivet 7 having at the inner side of the ring, a head $7^a$ that extends into a hole $1^a$ formed in the spring 1 at a distance from its extreme free end, as shown in Fig. 4.

The rotary body 3 is provided with a tubular axial extension 3ᵃ (Fig. 7) arranged to surround a portion 2ᵃ of the driving shaft 2 of reduced diameter and to bear against a shoulder 2ᵇ on the portion of the shaft of greater diameter, the latter portion of the shaft and the extension 3ᵃ being of the same external diameter and both surrounded by the coiled spring 1. The inner end portion of the spring may be provided at a distance from its extreme end, with a pin 1ᵇ (Figs. 4 and 5) arranged to engage a hole or recess 3ᵇ (Fig. 7) in the tubular extension 3ᵃ. To assist in arresting the spring and rotary body 3 in such a manner as to reduce shock on the spring, the end of the rotary body adjacent to its axial extension 3ᵃ is provided with a narrow shoulder or projection 3ᶜ of non-circular shape, for instance of circular shape but with two oppositely arranged flat surfaces 3ᵈ (Fig. 8) upon which is fitted, as shown in Fig. 10, a plate 11 (Fig. 9) formed with a correspondingly shaped hole and provided at one part of its outer periphery, with a longitudinal extension 11ᵃ adapted to serve as an abutment. This abutment is adapted to be engaged by a second detent 12 immediately after the abutment 6 on the outer or free end portion of the coiled spring 1 has been engaged by its associated detent 4, that is to say, when the last mentioned detent has wholly or partly declutched the spring from the shaft 2. Thus, the second detent 12 will arrest the rotary body 3 immediately after the first detent 4 has declutched the spring from the shaft. The two detents 4 and 12, shown as levers, may be fixed to a spindle 13 that is common to them and mounted in bearings 14, and be operated by a link 15 (Fig. 1), or they may be otherwise so arranged that they will co-operate as described to arrest or to release the spring and rotary body. The plate 11 with second abutment 11ᵃ is held in place endways on the extension 3ᶜ by the spring 1 which bears against it.

By the construction of clutch mechanism described, the spring will be relieved of considerable shock and strain when it and the rotary body are arrested by the detents and also when it is released and allowed to clutch the shaft, with the result that its life will be considerably increased. Furthermore, such mechanism will be found to work practically without noise.

Such clutch mechanism may advantageously be used in telegraphic apparatus of various kinds. It may advantageously be used in tape punching apparatus of the kind described in the specifications of my application for Letters Patent filed 27th June 1922 Serial No. 571261 and my Letters Patent No. 1,543,906, in telegraphic transmitting apparatus of the kind described in the specification of my application for Letters Patent filed 25th October 1924, Serial No. 745,934, in telegraphic receiving and printing apparatus of the kind described in the specification of my application for Letters Patent filed 25th October 1924, Serial No. 745,935 and in telegraphic receiving and retransmitting apparatus of the kind described in the specification of my application for Letters Patent filed 12th April 1924, Serial No. 706,023, in lieu of the clutch mechanism used in such apparatus and comprising a spring controlled pawl carried by a sleeve cam and adapted to engage a toothed wheel on a driving shaft when released by an associated detent. The improved clutch mechanism may also advantageously be used in tape punching apparatus of the kind described in the specification of my Letters Patent No. 1,452,793 in lieu of the escapement mechanism described therein, and of the kind described in the specification of British Letters Patent No. 185,170, in lieu of the spring clutch mechanism used in that apparatus.

In applying the improved clutch mechanism to telegraphic apparatus of the kind hereinbefore described, the link 15 (Fig. 1) may be operated by an electric relay responsive to line signals.

What I claim is:—

1. Clutch mechanism of the kind herein referred to, comprising in combination with a rotary driving shaft and a rotary body to be rotated therefrom, a helically coiled spring connected at one end portion to said body and adapted, when released, to engage said shaft by its contractile action, an abutment connected to said spring near one end thereof, a second abutment connected to said rotary body and two detents adapted to engage said abutments.

2. Clutch mechanism of the kind herein referred to, comprising in combination with a rotary driving shaft and a rotary body to be rotated therefrom, a helically coiled spring connected at one end portion to said body and adapted, when released, to engage said shaft by its contractile action, an abutment connected to said spring near one end thereof, a second abutment connected to said rotary body and two detents adapted to engage said abutments, the detent for arresting the end portion of the spring connected to said body being arranged to come into operation shortly after the other detent has come into operation to arrest the other end portion of the spring.

3. Clutch mechanism of the kind herein referred to, comprising in combination with a rotary driving shaft and a rotary body to be rotated therefrom, a helically coiled spring connected at one end portion to said body and adapted, when released, to engage said shaft by its contractile action, a ring embracing and connected to said rotary body, an abutment carried by said ring, an abutment connected to the end portion of said spring remote from said rotary body and detents adapted to engage and arrest said abutments and attached parts.

4. Clutch mechanism of the kind herein referred to, comprising, in combination with a rotary driving shaft and a rotary body to be driven therefrom, a helically coiled spring adapted, when released, to engage said shaft by its contractile action, said body being connected to said spring at a distance from its adjacent extreme end, an abutment connected to said rotary body, an abutment connected to the other end portion of said spring remote from said rotary body, and detents adapted to engage said abutments.

5. Clutch mechanism of the kind herein referred to, comprising, in combination with a rotary driving shaft and a rotary body to be driven therefrom, a helically coiled spring adapted, when released, to engage said shaft by its contractile action, said body being connected to said spring at a distance from the adjacent extreme end thereof, abutments connected to said rotary body and spring near to the opposite end portions of said spring, and detents adapted to engage said abutments, the detent for arresting the abutment in connection with said body being arranged to come into action shortly after the other detent has come into action.

6. Clutch mechanism of the kind herein referred to, comprising, in combination with a rotary driving shaft and a rotary body to be driven therefrom, a helically coiled spring adapted, when released, to engage said shaft by its contractile action, said body being connected to said spring at a distance from the adjacent extreme end thereof, an abutment connected to the free end portion of said spring at a distance from its extreme end, a second abutment connected to said rotary body and detents adapted to engage the first and second mentioned abutments in quick succession.

7. Clutch mechanism of the kind herein referred to, comprising, in combination with a rotary driving shaft and a rotary body to be driven therefrom, a helically coiled spring adapted, when released, to engage said shaft by its contractile action, said body being connected to said spring at a distance from the adjacent extreme end thereof, an abutment connected to the free end portion of said spring, a second abutment mounted on the end portion of said rotary body adjacent to the end thereof connected to said spring and detents adapted to engage the first and second abutments in quick succession.

8. Clutch mechanism of the kind referred to, comprising in combination with a rotary driving shaft and a rotary body to be driven therefrom, a helically coiled spring surrounding said shaft and adapted, when released, to engage said shaft, said rotary body having a tubular axial extension located within the adjacent end portion of said spring and engaged therewith at a part thereof located at a distance from its extreme end, an abutment connected to the free end portion of the spring, a second abutment carried by the end portion of the rotary body adjacent to said spring and two detents adapted to engage the two abutments in successive order.

9. Clutch mechanism of the kind referred to, comprising in combination with a rotary driving shaft and a rotary body mounted to turn on a portion of said shaft of reduced diameter and having an axial extension the diameter of which corresponds with that of the unreduced portion of said shaft and abuts against such portion of the shaft, a helically coiled spring surrounding said shaft and adapted, when released, to engage said shaft, one end portion of said spring surrounding the extension of said body and connected thereto at a distance from its extreme end, an abutment connected to the free end portion of said spring, an abutment connected to the end portion of said rotary body adjacent to said spring and two detents adapted to engage and hold said abutments.

10. Clutch mechanism of the kind referred to, comprising in combination with a rotary driving shaft and a rotary body mounted to turn on a portion of said shaft of reduced diameter and having an axial extension the diameter of which corresponds with that of the unreduced portion of said shaft and abuts against such portion of the shaft, a helically coiled spring surrounding said shaft and adapted, when released, to engage said shaft, one end portion of said spring surrounding the extension of said body and connected thereto at a distance from its extreme end, an abutment connected to the free end portion of said spring, an abutment connected to the end portion of said rotary body adjacent to said spring and two detents adapted to engage and hold the first and second mentioned abutments in quick succession.

11. Clutch mechanism of the kind referred to, comprising in combination with a rotary driving shaft and a rotary body mounted to turn on a portion of said shaft of reduced diameter and having an axial extension the diameter of which corresponds with that of the unreduced portion of said shaft and abuts against such portion of the shaft, a helically coiled spring surrounding said shaft and adapted, when released, to engage said shaft, one end portion of said spring surrounding the extension of said body and connected thereto at a distance from its extreme end, an abutment connected to the free end portion of said spring, a ring held on a shoulder on said rotary body by the adjacent end of said spring, but incapable of turning on said shoulder, an abutment carried by said ring and two detents adapted to engage and hold said abutments in quick succession.

12. Clutch mechanism of the kind herein referred to, comprising in combination with a rotary driving shaft, and a rotary body to be rotated therefrom, a helically coiled spring connected at one end portion to said body and adapted, when released, to engage said shaft by its contractile action, an abutment connected to said body, a second abutment connected to said spring near the end thereof remote from said body, a spindle, two detents fixed to said spindle and adapted to engage and hold said abutments and means for rocking said spindle.

13. Clutch mechanism of the kind herein referred to, comprising in combination with a rotary driving shaft, a rotary cam mounted on said shaft, a helically coiled spring connected at one of its end portions to said cam and adapted, when released, to engage said shaft by its contractile action, an abutment connected to said rotary body, a second abutment connected to the end portion of said spring remote from said rotary body, detents adapted to engage and hold said abutments and means for moving said detents into and out of engagement with said abutments.

14. Clutch mechanism of the kind herein referred to, comprising in combination with a rotary driving shaft, a rotary cam mounted on said shaft, a helically coiled spring connected at one of its end portions to said cam and adapted, when released, to engage said shaft by its contractile action, an abutment connected to the free end portion of said spring, an abutment connected to said cam, detents adapted to engage and hold said abutments and means for moving said detents into and out of engagement with said abutments.

Signed at Paris, France this fourth day of February, 1926.

FREDERICK GEORGE CREED.